(12) United States Patent
Horesh et al.

(10) Patent No.: US 11,216,959 B2
(45) Date of Patent: Jan. 4, 2022

(54) SYSTEM AND METHOD FOR MONITORING ACTIONS PERFORMED BY A ROBOTIC DEVICE

(71) Applicant: R-Go Robotics LTD., Caesarea (IL)

(72) Inventors: Nizan Horesh, Caesarea (IL); Amir Bousani, Kadima (IL); Assaf Agmon, Hod Hasharon (IL)

(73) Assignee: R-GO Robotics Ltd., Caesarea (IL)

( * ) Notice: Subject to any disclaimer, the term of this patent is extended or adjusted under 35 U.S.C. 154(b) by 0 days.

(21) Appl. No.: 17/004,440

(22) Filed: Aug. 27, 2020

(65) Prior Publication Data

US 2020/0394807 A1 Dec. 17, 2020

Related U.S. Application Data

(63) Continuation of application No. PCT/US2020/012538, filed on Jan. 7, 2020.

(60) Provisional application No. 62/789,735, filed on Jan. 8, 2019.

(51) Int. Cl.
| | |
|---|---|
| *G06K 9/00* | (2006.01) |
| *G06T 7/292* | (2017.01) |
| *H04N 5/225* | (2006.01) |
| *H04N 5/247* | (2006.01) |

(52) U.S. Cl.
CPC ............ *G06T 7/292* (2017.01); *H04N 5/2252* (2013.01); *H04N 5/247* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0234499 | A1* | 9/2009 | Nielsen | B25J 9/1666 700/250 |
| 2011/0231016 | A1* | 9/2011 | Goulding | G01C 21/20 700/246 |
| 2012/0265391 | A1* | 10/2012 | Letsky | G05D 1/0088 701/25 |
| 2014/0012787 | A1* | 1/2014 | Zhang | G06N 5/02 706/12 |

(Continued)

OTHER PUBLICATIONS

The International Search Report and the Written Opinion of the International Searching Authority for PCT/US2020/012538, dated Apr. 16, 2020, ISA/RU, Moscow, Russia.

*Primary Examiner* — Guillermo M Rivera-Martinez
(74) *Attorney, Agent, or Firm* — M&B IP Analysts, LLC (57) ABSTRACT

Systems and methods for monitoring movements. A method includes detecting motion based on first localization data related to a localization device moving in a distinct motion pattern, wherein the first localization data is based on sensor readings captured by at least one sensor; correlating the detected motion to a known motion of the localization device based on respective times of the first localization data and of the localization device; localizing the localization device with respect to a map based on the correlation; tracking at least one first location of an object based on second localization data captured by the at least one sensor, wherein the at least one first location is on the map, wherein the tracking further comprises identifying at least one second location of the object based on the second localization data and determining the at least one first location based on the at least one second location.

9 Claims, 6 Drawing Sheets

(56) References Cited

U.S. PATENT DOCUMENTS

| | | | |
|---|---|---|---|
| 2015/0212520 A1* | 7/2015 | Artes | G05D 1/0219 |
| | | | 701/2 |
| 2017/0225321 A1* | 8/2017 | Deyle | B25J 9/1679 |
| 2017/0225332 A1* | 8/2017 | Deyle | B25J 5/007 |
| 2017/0361468 A1* | 12/2017 | Cheuvront | G06F 16/00 |
| 2018/0071918 A1* | 3/2018 | Angle | H04L 67/125 |
| 2018/0074508 A1* | 3/2018 | Kleiner | A47L 9/2852 |
| 2018/0213731 A1* | 8/2018 | Wykman | A01C 21/007 |
| 2018/0328753 A1 | 11/2018 | Stenning et al. | |
| 2018/0341814 A1* | 11/2018 | Li | G08B 13/19613 |
| 2018/0361584 A1* | 12/2018 | Williams | G06F 16/29 |
| 2018/0365632 A1 | 12/2018 | Enssle et al. | |
| 2019/0094869 A1* | 3/2019 | Artes | G05D 1/0274 |
| 2019/0178654 A1* | 6/2019 | Hare | G06T 7/70 |
| 2019/0212752 A1* | 7/2019 | Fong | G06K 9/00 |
| 2019/0219409 A1* | 7/2019 | Tan | G05D 1/0212 |
| 2019/0354110 A1* | 11/2019 | Heinla | G05D 1/0274 |
| 2020/0150655 A1* | 5/2020 | Artes | G05D 1/0016 |
| 2020/0159246 A1* | 5/2020 | Cui | G05D 1/0274 |

* cited by examiner

SYSTEM AND METHOD FOR MONITORING ACTIONS PERFORMED BY A ROBOTIC DEVICE

CROSS-REFERENCE TO RELATED APPLICATIONS

This application is a continuation of International Patent Application No. PCT/US2020/012538 filed on Jan. 7, 2020, now pending, which claims the benefit of U.S. Provisional Application No. 62/789,735 filed on Jan. 8, 2019.

The contents of the above-referenced applications are hereby incorporated by reference.

TECHNICAL FIELD

The present disclosure relates generally to monitoring movements, and more specifically to techniques for monitoring actions by robotic devices and movements by objects.

BACKGROUND

With the increasing use of robots and robotic devices, there is a need to effectively monitor activities of those robotic devices. In particular, movements of a robot may need to be monitored to track progress in performing movement-related tasks.

Additionally, for some implementations, it may be important to monitor presence and/or movements of non-robot objects such as people, animals, dirt, and the like. For example, it may be helpful to track locations of objects within a place to avoid collisions between a robotic device operating in the space and the tracked objects.

Existing solutions for tracking movements of objects include simultaneous localization and mapping (SLAM) as well as monitoring of visual multimedia content (e.g., images and/or videos) showing objects moving. These existing solutions face various challenges. For example, SLAM techniques require that the objects tracked be equipped with sensors such as cameras, inertial measurement units (IMUs), etc.). This requirement may be acceptable for tracking objects such as robots that generally include suitable computational components. However, requiring tracked objects to be equipped with sensors is generally not acceptable for tracking other objects such as animals or people and may be unfeasible for tracking smaller objects.

Further, SLAM techniques do not monitor progress of activities performed by the tracked objects. Monitoring visual multimedia content allows for tracking non-computerized objects, but such visual monitoring often cannot accurately monitor actions taken by the objects and/or require significant computing resources to monitor those actions. For example, a path of a cleaning robot may be determined through monitoring visual multimedia content, but portions of the path in which the cleaning robot was actually cleaning may not be determined.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for monitoring movement of objects in space. The method comprises: detecting motion based on first localization data related to a localization device moving in a distinct motion pattern, wherein the first localization data is based on sensor readings captured by at least one sensor; correlating the detected motion to a known motion of the localization device based on respective times of the first localization data and of the localization device; localizing the localization device with respect to a map based on the correlation; tracking at least one first location of an object based on second localization data captured by the at least one sensor, wherein the at least one first location is on the map, wherein the tracking further comprises identifying at least one second location of the object based on the second localization data and determining the at least one first location based on the at least one second location.

Certain embodiments disclosed herein also include a non-transitory computer readable medium having stored thereon causing a processing circuitry to execute a process, the process comprising: detecting motion based on first localization data related to a localization device moving in a distinct motion pattern, wherein the first localization data is based on sensor readings captured by at least one sensor; correlating the detected motion to a known motion of the localization device based on respective times of the first localization data and of the localization device; localizing the localization device with respect to a map based on the correlation; tracking at least one first location of an object based on second localization data captured by the at least one sensor, wherein the at least one first location is on the map, wherein the tracking further comprises identifying at least one second location of the object based on the second localization data and determining the at least one first location based on the at least one second location.

Certain embodiments disclosed herein also include a system for monitoring movement of objects in space. The system comprises: a processing circuitry; and a memory, the memory containing instructions that, when executed by the processing circuitry, configure the system to: detect motion based on first localization data related to a localization device moving in a distinct motion pattern, wherein the first localization data is based on sensor readings captured by at least one sensor; correlate the detected motion to a known motion of the localization device based on respective times of the first localization data and of the localization device; localize the localization device with respect to a map based on the correlation; track at least one first location of an object based on second localization data captured by the at least one sensor, wherein the at least one first location is on the map, wherein the tracking further comprises identifying at least one second location of the object based on the second localization data and determining the at least one first location based on the at least one second location.

Certain embodiments disclosed herein also include a method for monitoring actions performed by a robotic device. The method comprises: creating a heat map based on localization data and active region data generated by a localization device, wherein the localization data indicates a plurality of positions of the localization device with respect to a map, wherein the active region data indicates whether the localization device was performing at least one action at each of the plurality of positions, wherein the heat map includes a plurality of values corresponding to the plurality of positions, wherein each of the plurality of values is determined based on the active region data.

BRIEF DESCRIPTION OF THE DRAWINGS

The subject matter disclosed herein and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for monitoring movements and actions within a space. In various embodiments, a localization device is deployed within a space. Data related to movement of the localization device is captured and processed to check progress of actions performed by the localization device, to determine locations of other objects in the space, or both.

In an embodiment, a localization device is configured to localize itself with respect to a predetermined map representing a space and to compute its active regions within the map as the localization device moves within the space. The active regions on the map are aggregated and a heat map visually demonstrating the active regions of the localization device is created. The heat map is updated as new active regions are computed and analyzed with respect to action data for the localization device to detect one or more predetermined events with respect to the actions performed by the localization device in the space. In some implementations, the localization device is included in or mounted to a robot or robotic device configured to move and perform actions within the space.

In another embodiment, a location of a localization device is mapped using one or more sensors. The sensors may be fixed sensors that are not configured for movement or are configured for limited movement (e.g., turning but no locomotion). Sensor readings captured by the sensors and motion data related to movement of a localization device are received. The sensor readings related to the localization device at various positions as it moves in one or more distinct motion patterns along a surface in a space. The sensor readings are analyzed to detect the position of the localization device, to detect general motion in the images, or both. The detected position or motion is correlated to a known position or motion, respectively, of the localization device. The known position or motion may be determined based on sensor signals captured by the localization device, for example using a simultaneous localization and mapping (SLAM) algorithm or based on readings from sensors such as accelerometers, gyroscopes, and the like.

Figure 1:
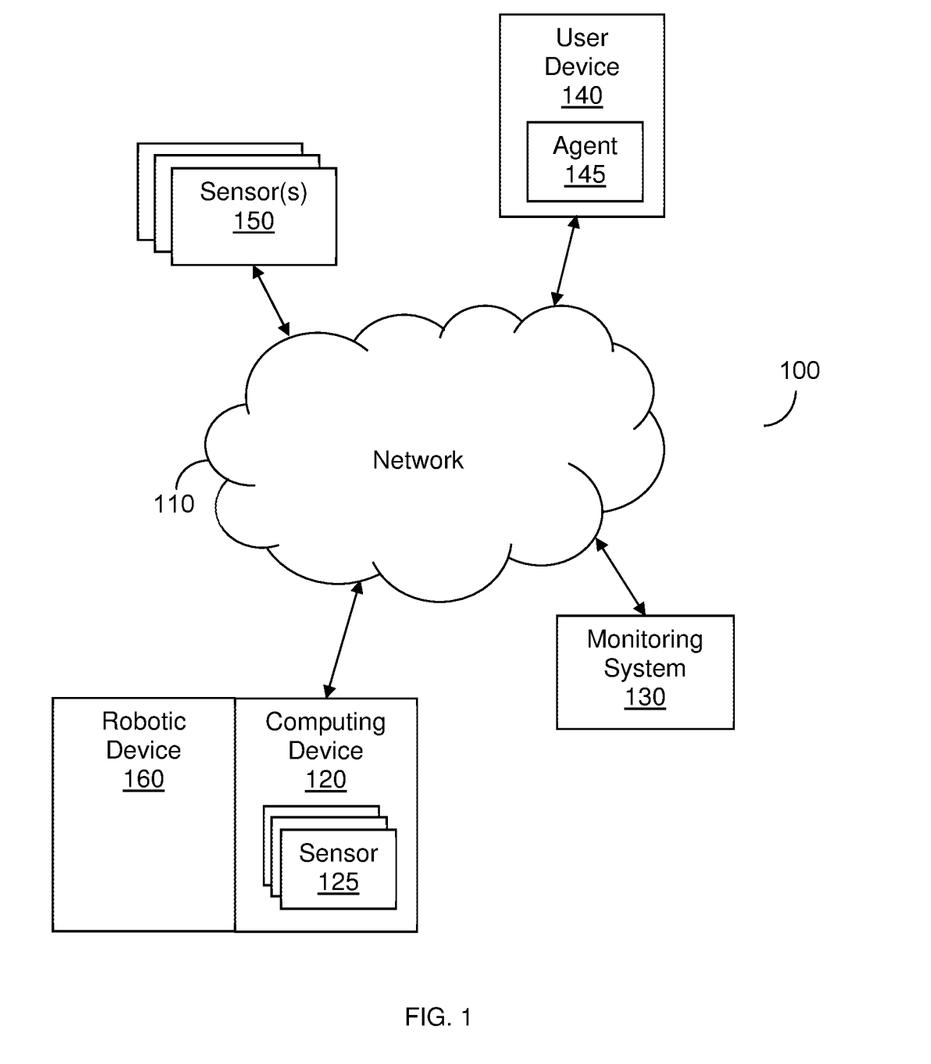
FIG. 1 is a network diagram utilized to describe the various disclosed embodiments.

FIG. 1 shows an example network diagram 100 utilized to describe the various disclosed embodiments. In the example network diagram 100, a localization device 120, a monitoring system 130, and a user device 140 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The localization device 120 may be affixed (e.g., mounted, shown) to or may be included in (not shown) a robotic device 160 or other device configured to move and perform actions. Alternatively, the localization device 120 may be a mobile device carried by, for example, a user (not shown). In some implementations, the localization device 120 or the robotic device 160 including the localization device 120 moves along a surface in a space. The localization device 120 may be configured to perform localization such as, for example, simultaneous localization and mapping (SLAM), with respect to a predetermined map of the space. To this end, the localization device 120 includes one or more sensors 125. The sensors 125 are configured to capture sensor signals used for localization, motion detection, both, and the like. The sensors 125 may include, but are not limited to, cameras, accelerometer, gyroscope, global positioning system (GPS) receiver, and the like.

To allow for performing self-localization, in an example implementation, the localization device 120 is equipped with localization components such as, but not limited to, a camera, a processing circuitry, and a memory storing instructions that, when executed by the processing circuitry, configures the processing circuitry to perform a SLAM algorithm with respect to images captured by the camera. The localization is performed with respect to a map which may be, for example, a predetermined map. The map may be, but is not limited to, a three-dimensional (3D) map of a scene including the space. Example techniques for creating a 3D map of a scene are described further in International Patent Application No. PCT/US19/54499, the contents of which are hereby incorporated by reference, as well as in FIG. 5 and FIG. 6 below.

The localization device 120 is further configured to collect data about actions performed by the robotic device 160. To this end, the robotic device 160 may be, for example but not limited to, a cleaning robot, a mobile inspection robot, a delivery robot configured to pick up and release items, a farming robot configured to water or spray crops, or a robot configured to perform other real-world actions. Such action data may include, but is not limited to, whether a cleaning device is actively cleaning and what is the cleaning region for the device, a region covered by sensors of a mobile inspection device, and the like.

The monitoring system 130 is configured to receive localization data, active region data, motion data, action data, or a combination thereof, from the localization device 120. Based on the data received from the localization device 120, the monitoring system 130 is configured to perform one or more of the disclosed embodiments. Specifically, in an embodiment, the monitoring system 130 may be configured to create a heat map (e.g., as described below with respect to FIG. 2) and to detect predetermined events based on the heat map and action data for the localization device 120. In another embodiment, the monitoring system 130 is configured to identify a location of the localization device 120 with respect to a surface of the space (e.g., a floor) shown in images of the space and, based on the location of the localization device 120, to determine a position of one or more objects with respect to the surface and new images showing the space.

In an example implementation, the monitoring device 130 may be a mobile device such as, but not limited to, a tablet computer or smartphone. The mobile device may include any or all of the sensors 150. As a non-limiting example, when the sensors 150 include a camera, the camera may be a camera included in the mobile device. Alternatively or collectively, any or all of the sensors may be configured for locomotion independent of the monitoring system 130. As a non-limiting example, one or more of the sensors may be affixed to a drone or other moving system and configured to send sensor reading data to the monitoring system 130.

The user device (UD) 140 may be, but is not limited to, a personal computer, a laptop, a tablet computer, a smartphone, a wearable localization device, or any other device capable of receiving and displaying notifications. Specifically, the user device 140 is configured to display notifications and alerts indicating, for example, occurrence of predetermined events with respect to actions performed by the localization device 120. In an example implementation, the user device 140 includes an agent 145 configured for displaying notifications and alerts sent by the monitoring system 130.

The sensors 150 are deployed in a space to be monitored and are configured to capture sensor readings representing motion in the space or portions thereof. The sensors 150 may be, but are not limited to, cameras or other motion detecting sensors (e.g., infrared sensors, motion sensors, ultrasonic sensors, and the like. In an embodiment, the sensors 150 may be a camera deployed such that it can capture images showing the localization device 120 moving. To this end, the sensors 150 may be fixed cameras or cameras configured for locomotion (e.g., a camera affixed to a drone or other system configured for locomotion).

It should be noted that various embodiments are discussed with respect to receiving data processed by the localization device 120, but at least some implementations may include the same data processing being performed by, for example, the monitoring system 130 or an external system (not shown) without departing from the scope of the disclosure. Further, in various implementations, the monitoring system 130 may be implemented as deployed in a cloud computing environment (not shown) and implemented as a cloud service.

Figure 2:
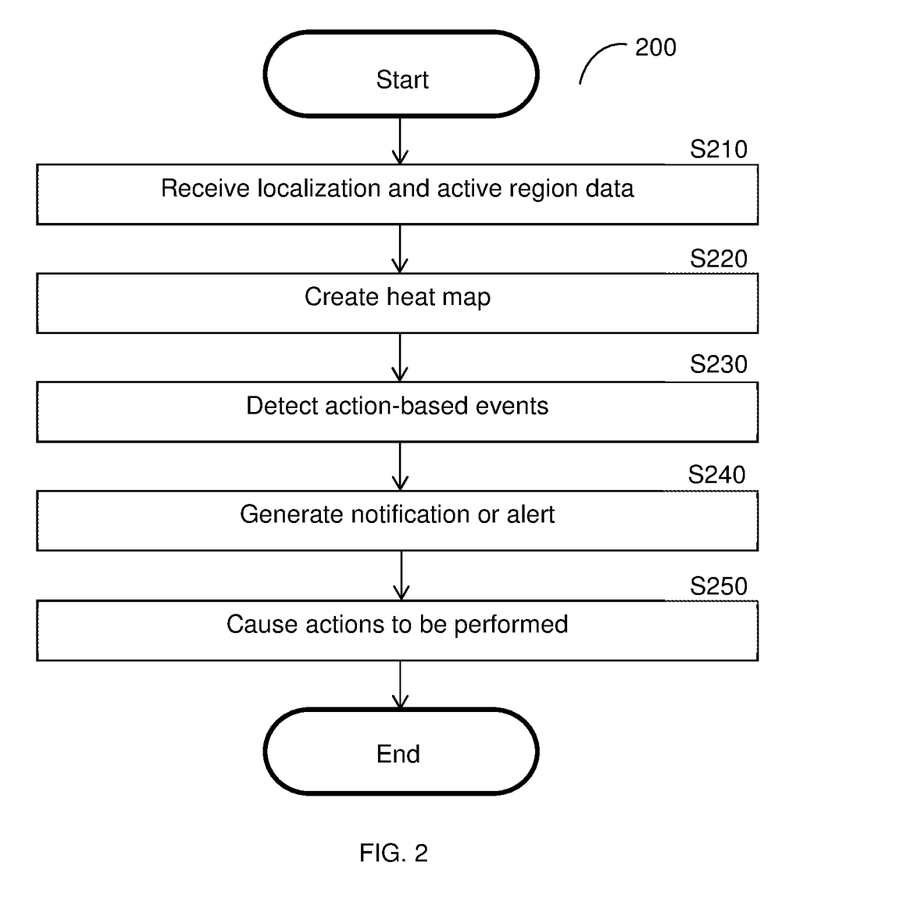
FIG. 2 is a flowchart illustrating a method for monitoring actions performed by a robotic device in a space according to an embodiment.

FIG. 2 is an example flowchart 200 illustrating a method for monitoring actions performed by a robotic device in a space according to an embodiment. In an embodiment, the method is performed by the monitoring system 130, FIG. 1.

At optional S210, localization and active region data generated by a localization device that moves in a space is received from the localization device. The localization data represents the position of the localization device with respect to a map and may be determined using, for example, SLAM. The active region data indicates whether the localization device was performing one or more actions at each position indicated in the localization data. The active region data may further indicate which actions were performed at each position, an intensity of each action performed at each position, or both. In some implementations, the method may be performed by the localization device or a robotic device including the localization device such that the localization and active region data is generated by the localization device without being sent to or received at another system.

At S220, a heat map is created based on the localization and active region data. The heat map indicates the positions of the localization device at various points while moving within the space.

In an embodiment, the heat map is created based on a pose of the localization device. The pose of the localization device indicates the location of the localization device with respect to a two-dimensional (2D) or three-dimensional (3D) array of the space as well as an orientation of the localization device. The array includes heat values that correspond to respective cells of a grid of the map representing positions of the localization device, with each heat value indicating actions performed at that position within the space represented by the map.

Based on the pose of the localization device and its action state (e.g., whether the localization device or a robotic device affixed thereto is currently performing actions such as cleaning, inspecting, etc.) at various times while the localization device moves within the space, the values of the grid cells in the array are increased accordingly. For example, for portions of the space in which the localization device performed certain actions, the heat values are higher than portions of the space in which the localization device did not perform those actions. Further, heat values for portions of the space where actions were performed multiple times may be higher than those of portions of the space where actions were performed only once or no times.

In some implementations, the heat map values may be incremented for each instance of actions being performed in a portion of the space. In other implementations, the heat map values may be increased proportional to an intensity of actions being performed for each instance of actions being performed. As a non-limiting example, when the localization device is included in a cleaning robot, the heat map value for a portion of the space may be incremented by 1 for each second during which the cleaning robot was performing cleaning actions (e.g., vacuuming) in the space, or the heat map value may be increased by a value proportional to the intensity of the cleaning actions being performed (e.g., based on airflow, air speed, suction, water lift, etc. of the vacuum cleaner) during each second in which cleaning actions were performed.

At S230, one or more action-based events are detected based on the heat map and action data collected by a device in the space. Such events may include, but are not limited to, a region of the map not being covered in a period of time (e.g., a region not being cleaned by a cleaning robot within the past 24 hours), sufficient coverage being achieved (e.g., actions being performed in a percentage of the map above a predetermined threshold), and the like.

At optional S240, a notification or alert is generated. The notification indicates the detected action-based events and may be sent to, for example, a user device (e.g., the user device 140, FIG. 1). Specifically, in some implementations, the notification may be sent to an operating system of the user device. To this end, the notification may be generated in an appropriate format for the operating system of the user device to which it is sent. The alert indicates the detected action-based events and may be sent, for example, to the localization device. The localization device, in turn, may be configured to perform actions based on the alert. As a non-limiting example, when the alert indicates that an area has not been patrolled in the last 30 minutes, a drone acting as the localization device may move to the area.

At S250, a robotic device is caused to perform additional actions based on the action-based events. To this end, the notification sent at S240 may include the heat map, instructions for performing actions, commands for performing actions, and the like. In a further embodiment, S250 includes determining the actions to be performed and corresponding instructions or commands based on the heat map, the action-based events, or both. In an alternative embodiment, the method may be performed by the localization device when the localization device is a robotic device. In such an embodiment, the actions may be performed without generating a notification.

The additional actions may include, but are not limited to, cleaning, mowing a lawn, patrolling (i.e., capturing images of activity occurring in an area), and picking up an object. As a non-limiting example, when the action-based events indicate that a region has not been cleaned or mowed within 24 hours, the additional actions include cleaning or mowing the region, respectively. As another non-limiting example, when the action-based events indicate that in-process goods have not been moved from a workstation in a warehouse within 1 hour, the additional actions include picking up and moving objects away from the workstation. As yet another non-limiting example, when the action-based events indicate that a region has not been patrolled within 1 hour, the additional actions include moving a security robot to the region for inspection of activity occurring in the region.

Figure 3:
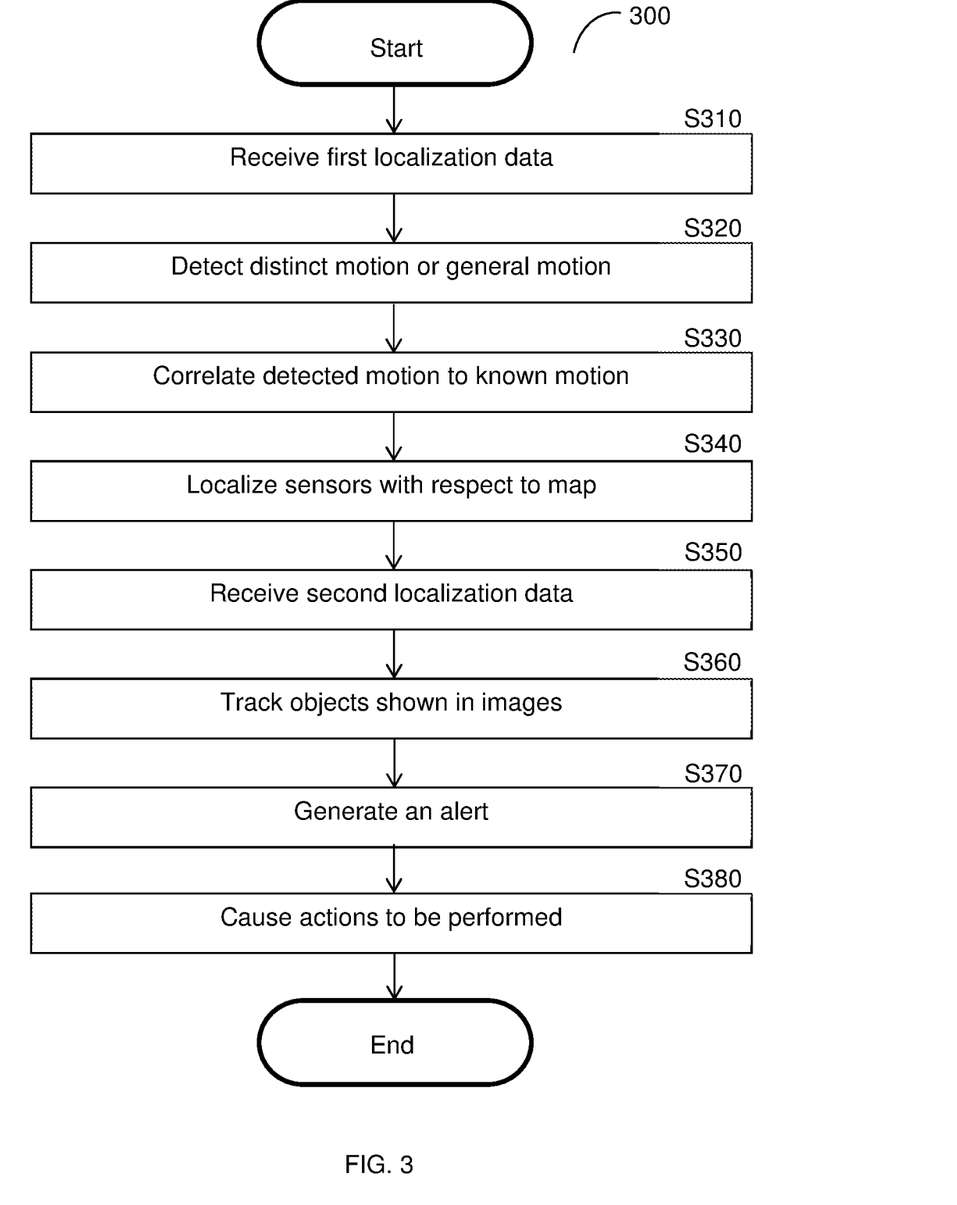
FIG. 3 is a flowchart illustrating a method for monitoring movement of objects in a space according to an embodiment.

FIG. 3 is an example flowchart 300 illustrating a method for monitoring movement of objects in a space according to an embodiment. In an embodiment, the method is performed by the monitoring system 130, FIG. 1.

At S310, localization data related to motion of a localization device (e.g., the localization device 120, the robotic device 160 including or affixed to the localization device 120, etc.) in a space is received. The localization data is based on sensor signals captured by sensors deployed in the space. In an embodiment, the localization data includes data indicating the movement detected by sensors external to the localization device such as, but not limited to, motion detectors, infrared sensors, ultrasonic detectors, combinations thereof, and the like. The movement is in a distinct motion pattern such that the localization device can be uniquely identified among objects in the space. The distinct motion pattern may be a predetermined known motion pattern. More specifically, the distinct motion pattern may be selected such that it is unlikely to be matched by other objects in the space.

In another embodiment, the localization data includes images showing the localization device moving in a space. The images show the localization device moving in a distinct motion pattern. The distinct motion pattern is different from motions of other objects in the environment such that the localization device may be uniquely identified when contrasted with movement of other objects in the space. As a non-limiting example, the localization device may be moved back and forth in random directions.

At S320, the localization data is analyzed to detect one or more motions demonstrated by the localization data. Each motion includes one or more distinct motion patterns of the localization device, general motion in (e.g., optical flow shown in images), or both. The motions include motions by objects within the space.

At S330, each detected motion is correlated with a known motion of the localization device.

The correlation for each detected motion is performed with respect to times of the detected motion and the known motion. To this end, in an example implementation, the correlation is performed based on a common time shared by the camera and by the localization device. In an alternative implementation, the correlation may be performed by comparing the motions at different time offsets between the beginning of the detected motion and the beginning of the known motion in order to identify the highest correlation, where the offset with the highest correlation is used.

In another embodiment, the known motion of the localization device may be determined by correlating motion detected in images with sensor readings captured by sensors included in the localization devices such as, but not limited to, accelerometer, gyroscope, global positioning system (GPS) receiver, and the like. To this end, in some implementations, the localization device is configured to determine its position with the map. The map may be predetermined or may be an arbitrary frame of reference for the localization device, for example as determined using simultaneous localization and mapping (SLAM). In another implementation, the position of the localization device may be determined by an external entity (e.g., a server) using data received from the localization data such as, but not limited to, the sensor data.

In an embodiment, S330 includes determining a correlation between each detected motion with the known motion and selecting the detected motion having the highest determined correlation as representing the motion of the localization device.

At S340, based on the correlation between the detected motion and the known motion, the camera is localized with respect to the map such that locations in images captured by the camera can be matched to locations on the map. Specifically, the correlation allows for identifying locations of objects in the space and, further, along a surface in a three-dimensional space. In an embodiment, the surface on which the localization device moves is known such that a geometry of the known surface may be determined based on the movements of the localization device thereon.

At S350, one or more new images are received from the camera. The new images show objects in the space such as, but not limited to, people, animals, robots, floor texture (e.g., dirt or dust on a floor), and the like.

At S360, based on the new images, locations of the objects with respect to the map are tracked. To this end, S360 includes identifying a location of each object within the new images and determining, based on the object locations in the images and the localization, a location of each object in the space and, specifically, on a surface in the space.

In an example implementation, the tracking includes tracking movements of objects along the surface. As a non-limiting example, a human moving along a floor may be tracked by identifying their foot in the new images and identifying a location of their foot with respect to the map. As another non-limiting example, locations in which dirt is accumulated may be tracked.

At optional S370, an alert is generated. The alert may be generated, for example, in response to an event detected based on the tracking. As non-limiting examples, such events may include, but are not limited to, an object moving over a particular part of a surface at least a threshold number of times (e.g., a human walking over a particular spot 3 or more times), a threshold accumulation of dirt, and the like. The alert may be sent to a user device (e.g., the user device 140, FIG. 1) to notify a user of the event, to a robotic device (e.g., the localization device 120 or a robotic device including the localization device 120) to notify the robotic device of the event, both, and the like.

In an embodiment, the robotic device to which the alert is sent may be configured to perform or refrain from performing actions based on the alert. Such actions may include, but are not limited to, cleaning, mowing a lawn, patrolling an area, and picking up an object. As a non-limiting example, the alert includes locations of objects including dirt to which a cleaning robot should move in order to clean. As another non-limiting example, the alert includes a location of a human to which a lawn mowing robot should not move. As yet another non-limiting example, the alert includes a location of an object in a warehouse to be picked up and relocated. In a further embodiment, the alert may include instructions for performing or commands to perform actions such that the alert, when sent to the robotic device, causes the robotic device to perform or refrain from performing actions with respect to the tracked objects.

At S380, actions are caused to be performed based on the tracking of the objects. The actions may be performed, for example, by the localization device, a robotic device including the localization device, or a robotic device in the same general area as the localization device (i.e., a robotic device deployed near the objects shown in images captured by the localization device). To this end, S380 may include sending instructions or commands for performing one or more actions. In a further embodiment, S380 includes determining the instructions or commands for performing the actions based on the locations of the tracked. As a non-limiting example, a localization device acting as a cleaning robotic device may track the locations of dirt, determine that those locations of dirt should be cleaned, and clean accordingly.

Figure 4:
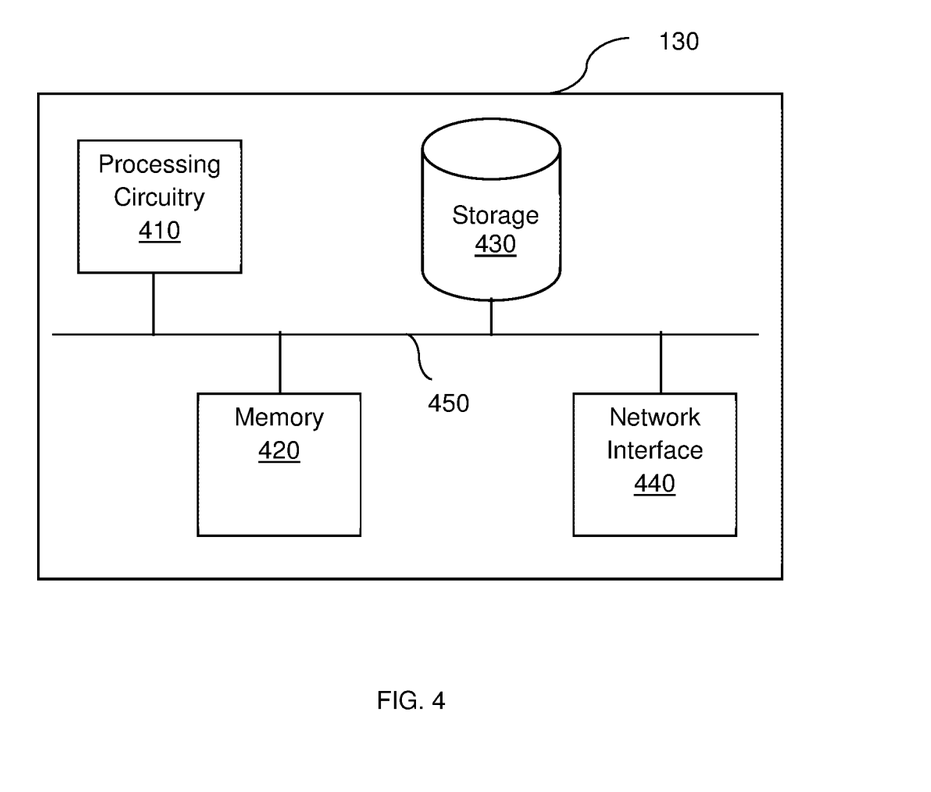
FIG. 4 is a schematic diagram of a system according to an embodiment.

FIG. 4 is an example schematic diagram of a monitoring system 130 according to an embodiment. The monitoring system 130 includes a processing circuitry 410 coupled to a memory 420, a storage 430, and a network interface 440. In an embodiment, the components of the monitoring system 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein. Specifically, the instructions, when executed, cause the processing circuitry 410 to generate fleet behavior models and detect anomalous behavior in fleets or sub-fleets as described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the monitoring system 130 to communicate with the localization device 120 and the user device 140 for the purpose of, for example, receiving data (e.g., localization and active region data, visual multimedia content such as images, etc.), sending alerts or notifications, and the like.

It should be understood that the embodiments described herein are not limited to the specific architecture illustrated in FIG. 4, and other architectures may be equally used without departing from the scope of the disclosed embodiments.

Figure 5:
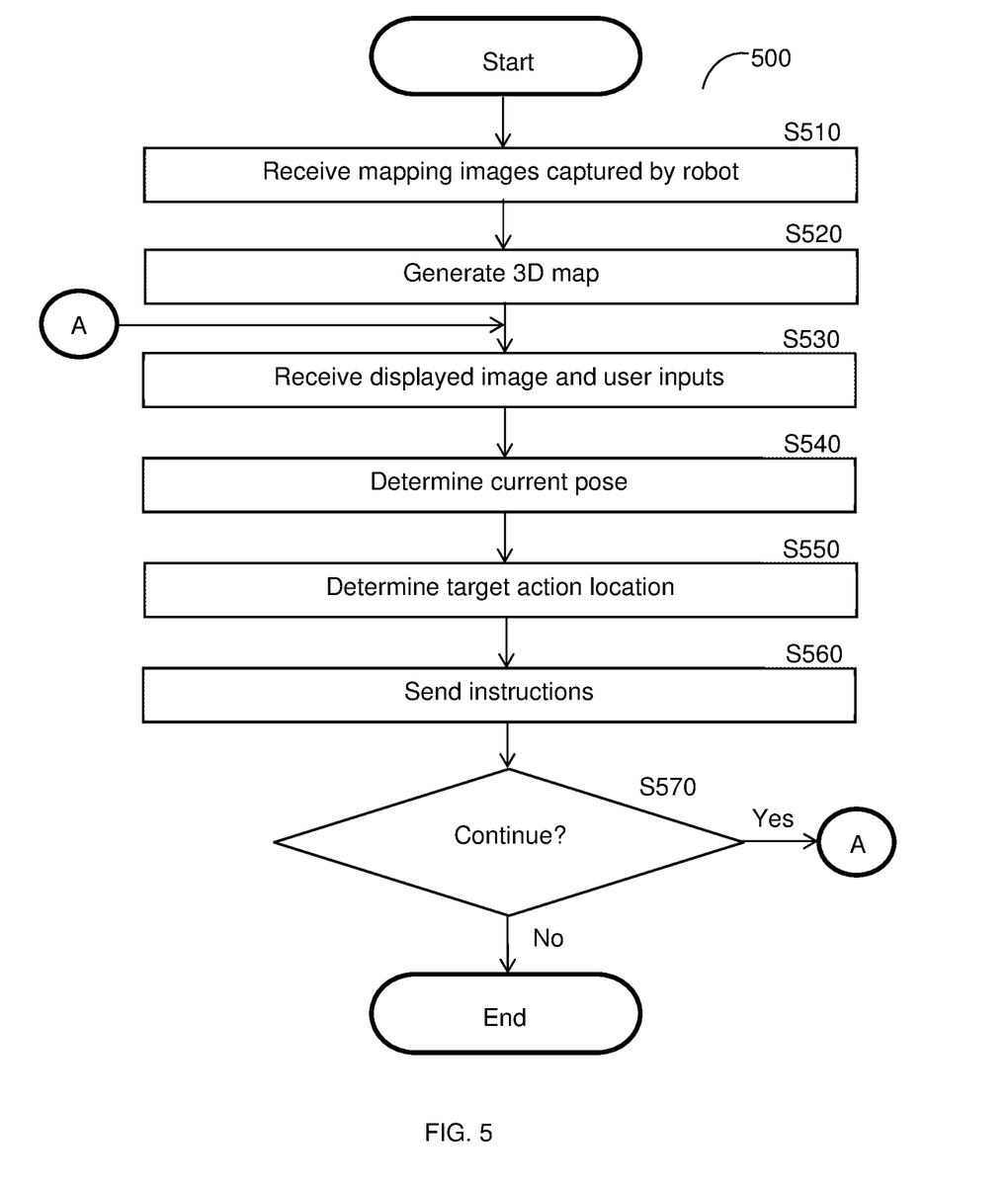
FIG. 5 is a flowchart illustrating a method for providing geometrical user interactions via three-dimensional mapping according to an embodiment.

FIG. 5 is an example flowchart 500 illustrating a method for providing geometrical user interactions via three-dimensional mapping according to an embodiment.

At S510, a set of first mapping images captured by a camera of a system (e.g., the robotic device 160, FIG. 1) deployed in a scene is received. The mapping images are utilized to map the scene. In an embodiment, S510 may include correcting the mapping images to eliminate geometric distortions and photometric distortions (e.g., lens shading).

At S520, a three-dimensional (3D) map of the scene is generated based on the received mapping images. To this end, S520 includes detecting key points in each of the mapping images and determining associated descriptors for the detected key points as described further herein below with respect to FIG. 6. In an embodiment, the 3D structure of the scene is determined based on appearances of one or more of the key points in multiple images. In an embodiment, the key points are selected such that they have high recall (i.e., such that the same key point may be identified in different images despite changes in perspective and illumination among images), high precision (i.e., such that only sufficiently distinguishable key points are detected), or both.

The 3D map may be created using Structure from Motion (SfM) to compute 3D coordinates of the key points in the mapping images. The results of the SfM are a batch estimation of the 3D structure of the scene. Alternatively, simultaneous localization and mapping (SLAM) may be utilized for online estimation of the 3D structure of the scene. In another implementation, the SfM or SLAM estimation can be achieved using a combination of sensors such as, but not limited to, an inertial measurement unit (IMU) and wheel encoders.

In another embodiment, the 3D structure of the scene may be determined using another method such as, but not limited to, using a depth camera to determine 3D features of the scene or an image-based method that does not utilized key points as described herein. Coordinates of the 3D structure determined using such a method may be associated with key points detected in the image by interpolating the 3D structure as seen from the perspective of each mapping image at the 2D location of its respective key points.

At S530, a second displayed image and user inputs are received. The user inputs are based on user interactions with respect to the displayed image as displayed via a user device and may be, for example, a click, a touch on a touchscreen, a drag, a press of a button (e.g., an arrow key), interaction with a joystick, other gestures, and the like.

The displayed image, like the mapping images, is also captured by the camera of the system. The displayed image shows the scene essentially from the perspective of the system at the time of capture of the displayed image. It should be noted that the displayed image may not be displayed on the user device and, instead, may be displayed via any display in communication with the user device without departing from the scope of the disclosed embodiments. For example, the user device may send the image to be displayed to an external display device and may receive the user inputs.

At S540, a current pose of the camera that captured the displayed image is determined based on the displayed image. Since the camera is deployed with the robotic device as described above, the pose of the camera is approximately the same as the pose of the system deployed with the camera. A location of the current pose is among the 3D coordinates included in the generated 3D map. In an embodiment, S540 includes detecting key points in the displayed image and determining descriptors for one or more key points in the displayed image, for example as described further herein below with respect to steps S610 and S620 of FIG. 6. The descriptors determined for the displayed image are compared to the descriptors of key points in the 3D map to identify matching descriptors in the 3D map and, accordingly, to determine a pose of the camera with respect to the 3D map (i.e., an estimated position of the camera within the 3D map and an estimated orientation of the camera with respect to key points of the 3D map).

The current pose is determined with respect to the locations of the 3D map identified in the displayed image. Specifically, given the matched descriptors, a geometrical transformation may be determined between the key points in the 2D displayed images and the key points of the 3D map using 3D pose estimation with 2D to 3D point correspondence. Alternatively, a 3D estimation of the key points in the displayed images may be determined using SfM or SLAM followed by 3D-to-3D point correspondence. In yet another implementation, orientation information as measured from an inertial measurement unit (IMU and a digital compass to search for 3D poses with suitable orientations in comparison to the displayed images. Based on the determined geometric transformation, a current pose of the camera with respect to the 3D map may be determined.

At S550, a target action location is determined based on the user inputs with respect to the displayed image. The target action location is a location to which the system deployed with the camera should move, at which the system deployed with the camera should perform one or more real-world actions, or both. As a non-limiting example, a user may tap a touchscreen displaying the second image, thereby indicating that the target navigation location is to be a location represented by the tapped portion of the touchscreen. As another non-limiting example, a user may click, using a mouse, a portion of the second image as displayed on a user device to be selected as the target navigation location. As yet another example, the user may drag their finger along the touchscreen to select a line or curve on the screen, thereby indicating a target navigation location and a potential route. As yet another example, the user may drag their finger along the touchscreen to select a region or region boundary in order to mark an area to be covered by the robot operation, or alternatively to define a "no-go" region. In some implementations, the interaction may not involve interacting with the display. For example, a user may utilize a pointing device (e.g., a light gun, a laser pointer, etc.) to indicate a direction for moving to the navigation location without touching or otherwise interacting with the image displayed on a screen.

In an embodiment, the user inputs used for determining the target action location define a 3D ray within the space represented by the displayed image. To this end, the user inputs may indicate a point, line, curve, and the like. For a point, a single point in the 2D image may correspond to a 3D ray. A line or curve may correspond to multiple 3D rays. The target action location may be determined by intersecting the 3D ray indicated by the user with the 3D structure of the scene. The point at which the 3D ray intersects with the scene geometry is determined as the target action location.

At S560, instructions are sent to the system. The instructions are for performing one or more actions with respect to the target action location and may include these locations, a proposed route for navigating from one location to the other, instructions for specific movements along the proposed route (e.g., ascend, descend, move left, move right, move forward, move backward, etc.), instructions for other actions to be performed at the target action location (e.g., picking up an object, dropping an object, capturing images of an object, etc.), a combination thereof, and the like.

At S570, it is determined whether execution should continue and, if so, execution continues with S530 where additional user inputs are received with respect to a new displayed image displayed via the user device; otherwise, execution terminates.

Figure 6:
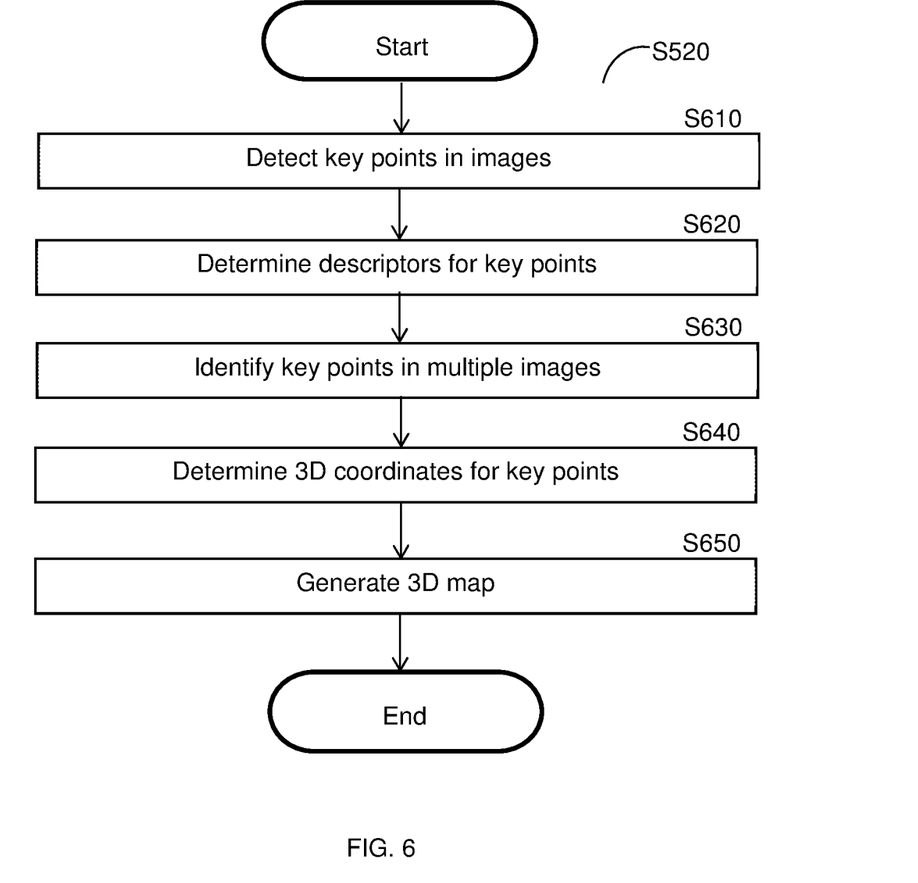
FIG. 6 is a flowchart illustrating a method for identifying locations in a three-dimensional environment based on images captured by a robot according to an embodiment.

FIG. 6 is an example flowchart S520 illustrating a method for identifying locations in a three-dimensional environment based on images captured by a robot according to an embodiment. In an embodiment, the method is performed with respect to the mapping images received at S510, FIG. 5.

At S610, key points in the images are detected. Each key point is salient such that it is noticeable and distinguishable from other points of the image. To this end, S610 may include using a method for finding key points in an image such as, but not limited to, applying a Harris Corner Detector operator, applying a Shi-Tomasi Corner Detector operator, detecting scale-space extrema, and approximation using Differences-of-Gaussians (DOG). In an embodiment, the key point detection is configured for high recall and high precision with respect to identifying key points that are likely to be sufficient. Specifically, in an example implementation, a threshold area under a Receiver Operating Characteristic (ROC) curve may be utilized to determine whether the recall and precision are sufficient. In another example implementation, the recall or the precision may be fixed and the other value may be compared to a threshold to determine if the recall and precision are suitable.

At S620, descriptors are determined for each detected key point. Each descriptor is determined based on the respective image and the corresponding key point. Each descriptor is one or more values (e.g., a set of numbers such as real numbers, integer numbers binary numbers, etc.) that collectively describe image information around the corresponding key point and is associated with its corresponding key point.

In an embodiment, each descriptor can be used by a similarity function to allow for determining whether two descriptors likely represent the same key point. In an embodiment, each descriptor and its associated measure are invariant to image transformations such as pixel noise, perspective changes, and illumination changes. The descriptors that may be utilized may include, but are not limited to, a scale-invariant feature transform (SIFT), speeded-up robust features (SURF), binary robust independent elementary features (BRIEF), and oriented fast and rotated brief (ORB).

At S630, appearances of the key points in at least two of the images are identified. Specifically, each key point appearing in multiple images is identified as such. By identifying key points in multiple images, locations of those key points relative to each other may be determined. Accordingly, this identification allows for creating an internally consistent map of the key points and, therefore, the scene including the key points.

At S640, 3D coordinates of the key points are determined based on the key points and the identified appearances of one or more of the key points in multiple images. Determining the 3D coordinates may include performing Structure from Motion (SfM) to estimate a 3D structure of the scene based on the 2D images of the scene.

At S650, a 3D map is generated based on the 3D coordinates. The 3D map is composed of the 3D coordinates of the key points and their associated descriptors. In some implementations, the key points may also be organized in an additional data structure to allow for improved search efficiency. For example, a bag of words data structure may include the key points organized based on their descriptors.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for monitoring actions performed by a robotic device, comprising:
    creating a heat map based on localization data and active region data generated by a localization device, wherein the localization data indicates a plurality of positions of the localization device with respect to a map, wherein the active region data indicates whether the localization device was performing at least one action at each of the plurality of positions, wherein the heat map includes a plurality of values of grid cells corresponding to the plurality of positions, wherein each of the plurality of values of the grid cells is determined based on the active region data, wherein each of the plurality of values is increased for each instance of one of the at least one action being performed in the corresponding position of the plurality of positions, wherein the localization data further includes an orientation of the localization device at each of the plurality of positions, wherein each of the plurality of values is increased based further on the orientation of the localization device at each of the plurality of positions.

2. The method of claim 1, wherein the active region data is first active region data, further comprising:
    detecting at least one action-based event based on the heat map and second active region data related to the localization device.

3. The method of claim 2, wherein the at least one action indicated in the active region data is at least one first action, further comprising:
    causing the localization device to perform at least one second action based on the at least one action-based event.

4. The method of claim 3, wherein the at least one second action is at least one of: cleaning, mowing a lawn, patrolling, and picking up an object.

5. The method of claim 1, wherein the at least one action-based event includes at least one of: one of the at least one action not being performed in a region of the map within a period of time, and sufficient coverage being achieved for a region of the map.

6. The method of claim 1, wherein each of the plurality of values is based on an intensity of one of the at least one action being performed in the corresponding position of the plurality of positions.

7. The method of claim 1, wherein the localization data is determined using simultaneous localization and mapping.

8. The method of claim 1, further comprising:
    determining at least one action-based event based on the heat map; and
    generating a notification based on the heat map, wherein the notification indicates the at least one action-based event.

9. The method of claim 1, wherein the at least one action performed by the localization device is at least one first action, further comprising:
 generating an alert based on the heat map; and
 sending the alert to the localization device, wherein the localization device is configured to perform at least one second action based on the alert.

\* \* \* \* \*